United States Patent [19]
Fujita

[11] 3,955,216
[45] May 4, 1976

[54] RETENTION DEVICE FOR ENDLESS CARTRIDGE TAPE RECORDER

[75] Inventor: Kazumasa Fujita, Iwaki, Japan

[73] Assignee: Alps Motorola, Inc., Tokyo, Japan

[22] Filed: Dec. 13, 1974

[21] Appl. No.: 532,621

[30] Foreign Application Priority Data
Feb. 28, 1974 Japan.......................... 49-24176

[52] U.S. Cl............................... 360/137; 360/93; 242/55.19 A; 242/194
[51] Int. Cl.²........................................ G11B 15/00
[58] Field of Search...................... 360/93, 96, 137; 242/55.19 A, 194

[56] References Cited
UNITED STATES PATENTS

| | | | |
|---|---|---|---|
| 3,762,721 | 10/1973 | Corso et al. | 360/93 |
| 3,867,720 | 2/1975 | Tanaka | 360/93 |
| 3,867,721 | 2/1975 | Saunders | 360/93 |

Primary Examiner—James W. Moffitt
Attorney, Agent, or Firm—James W. Gillman; Donald J. Lisa

[57] ABSTRACT

A cartridge locking mechanism for a tape player device adapted to receive and play an endless tape cartridge having a front inclined side wall and a recess on the side, includes a bracket member, having a cartridge engaging member thereon, pivotally mounted to the tape player for movement into and out of the cartridge receiving opening. A cartridge sensing plate is also pivotally mounted to the chassis and includes an end portion biased into the cartridge receiving opening and engageable with the front inclined beveled side wall of the cartridge upon the insertion of the cartridge into the tape player. The end opposite the one end portion is engageable with the bracket member to hold the bracket member away from the cartridge receiving opening. Upon insertion of the cartridge into the player, the front inclined side wall of the cartridge engages the end portion of the sensing plate to deflect and rotate the sensing plate away from the cartridge receiving opening. Such movement disengages the other end from the bracket member such that spring means, coupled to the bracket member, biases the bracket member and the cartridge engaging member into engagement with the recess on the side of the cartridge to hold the cartridge in the playing position in the tape player device.

5 Claims, 3 Drawing Figures

RETENTION DEVICE FOR ENDLESS CARTRIDGE TAPE RECORDER

BACKGROUND OF THE INVENTION

The present invention is directed to an improved cartridge locking mechanism for use in a tape player device adapted to receive and play a tape cartridge having magnetic tape in endless array and a pinch roller therein.

It is desirable in tape player devices adapted to receive and play tape cartridges to include retention means therein for firmly positioning the tape cartridge in the player device against the tape drive apparatus. One such commercially available retention means is shown in FIG. 1, which is a diagrammatic view of a tape cartridge player illustrating the essential structure necessary for understanding retention devices according to the prior art. As shown in FIG. 1, on the underside of chassis 2 there is pivotally secured a C-shaped lever 14 on which a retention roller 15 is rotatably mounted so as to be engageable with a notch 1b provided on the side wall of the cartridge. As the endless tape cartridge 1 is inserted into the chassis 2, a lever 16, slidably mounted to the chassis 2, is engaged by the front end portion 1c of the cartridge 1 and moved in a forwardly direction. Upon the displacement of the lever 16 by the cartridge front wall 1c, the C-shaped lever 14 is engaged by the lever 16 and rotated against the force of an overcenter spring 17 coupling the chassis 2 to the C-shaped lever 14. When the tape cartridge 1 is nearly fully inserted, the overcenter spring 17 moves past the snap-over or overcenter position and the retention roller mounted on the C-shaped lever 15 engages notch 1b on the side wall of the cartridge to firmly latch the cartridge in the play position in the tape cartridge player.

The above described cartridge locking mechanism requires that the chassis contain tab portions for the several levers necessary to interact together. Such a structure requires considerable time and effort to install and utilizes considerable space within the player. Additionally, because of the need for compact tape players, the locking mechanisms previously available for cartridge type players prevent the development of compact tape player devices.

SUMMARY OF THE INVENTION

Accordingly, it is a primary object of the present invention to provide a new and improved cartridge locking mechanism for a tape player device adapted to receive and play an endless tape cartridge.

It is another object of the present invention to provide a new and improved cartridge locking mechanism which has relatively few moving parts, which is reliable in operation, simple in construction and inexpensive to fabricate.

Briefly, a preferred embodiment of the cartridge locking mechanism according to the present invention includes a bracket member pivotally mounted to the chassis of the tape player device. The chassis includes a tunnel adapted to receive a tape cartridge and the bracket member includes a cartridge engaging roller mounted thereon. The bracket member is pivotally movable between a first position wherein the cartridge engaging roller is positioned outside the tunnel and a second positon wherein the cartridge engaging roller is in engagement with a recess on the side wall of the cartridge to hold the cartridge in playing position. A cartridge sensing plate pivotally mounted to the chassis adjacent the tunnel includes an end portion having a roller mounted thereon spring biased into the tunnel for engagement by the inclined front side wall corner of the inserted cartridge. The end of the cartridge sensing plate opposite the one end portion includes a pin mounted thereon which pin is selectively engageable with a slot in the bracket member to hold the bracket member in the first position outside of the tunnel. Upon insertion of a cartridge into the tunnel, the inclined front corner of the cartridge engages the roller on the end of the cartridge sensing plate to push the plate outwardly away from the tunnel. The subsequent clockwise rotation of the sensing plate causes the pin mounted to the end opposite the one end to disengage the slot in the lever member. Spring means is coupled to the lever member to bias the lever member and the cartridge engaging roller into the tunnel. The resultant spring biased movement of the bracket member towards the tunnel causes the cartridge engaging roller to engage the recess in the side wall of the cartridge to hold the cartridge in the play position against the tape driving instrumentalities.

Removal of the cartridge from the tunnel forces the cartridge engaging roller out of the recess and the bracket member is rotated from the second position to the first position. Such movement of the bracket member results in the pin mounted on the end portion of the cartridge sensing plate to engage the slot and hold the bracket member in the first position away from the tunnel. The cartridge sensing plate is accordingly returned to its inward position whereby the roller thereon is positioned in the tunnel to await the insertion of the next tape cartridge.

DETAILED DESCRIPTION

Figure 1:
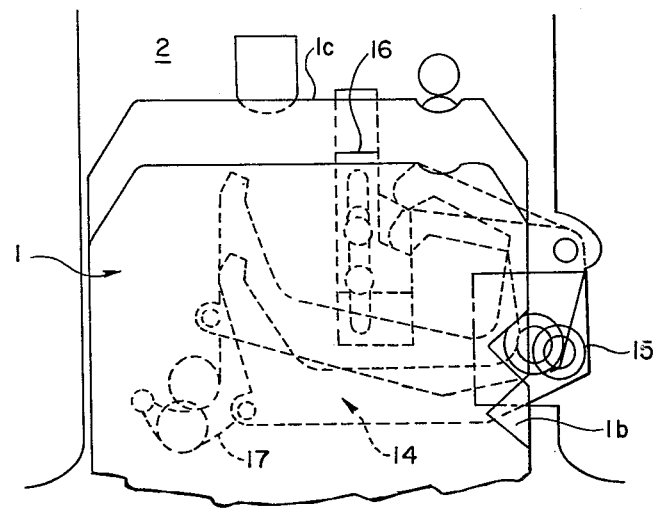
FIG. 1 is a plan view of a portion of a tape player device illustrating a cartridge locking mechanism for an endless tape cartridge in accordance with the prior art.
Figure 2:
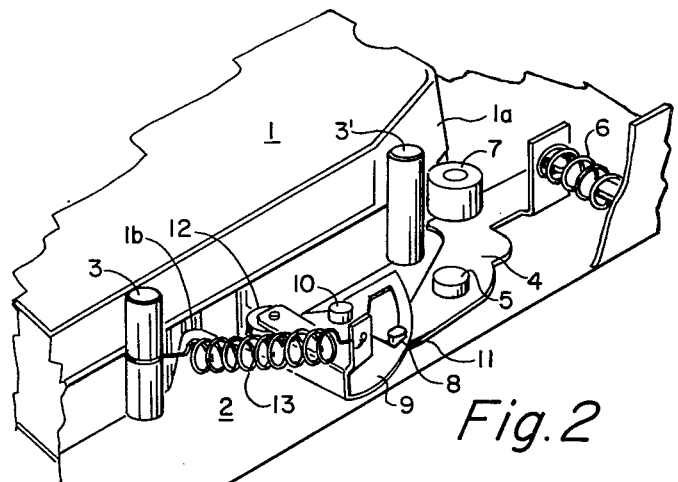
FIG. 2 is a perspective view of the cartridge locking mechanism in accordance with a preferred embodiment of the present invention illustrating the operation thereof prior to the insertion of a tape cartridge into the tape player device.
Figure 3:
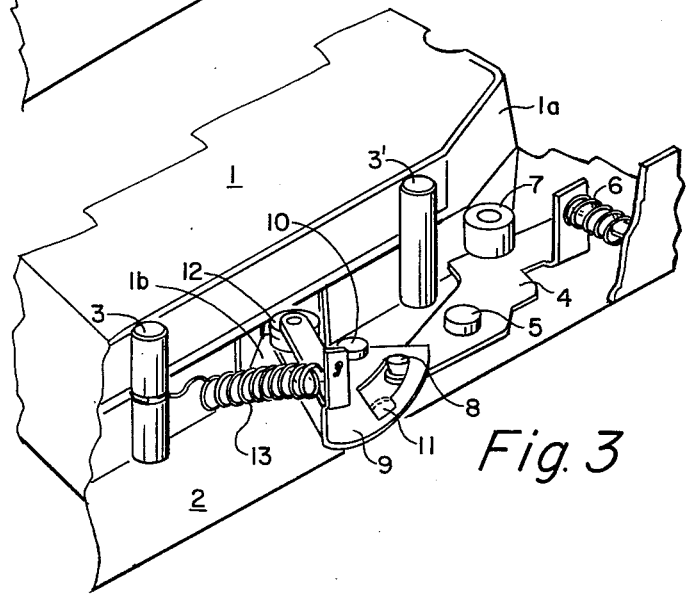
FIG. 3 is a perspective view of the cartridge locking mechanism in accordance with a preferred embodiment of the present invention illustrating the operation thereof when the tape cartridge is fully inserted into the tape player device.

Referring now to the drawings in greater detail wherein like numerals have been employed throughout the various views to designate similar components, in FIGS. 2 and 3 a pair of guide posts 3, 3' are secured to the tape player chassis 2. The guide posts 3, 3' are adapted to serve as guides for the tape cartridge 1 upon its insertion into the chassis 2 and to form a tunnel or cartridge receiving opening with a side wall (not shown), located on the chassis 2 on the side opposite the guide posts. The cartridge 1 having magnetic tape therein when fully inserted into the opening or tunnel engages tape playing instrumentalities, such as a capstan (not shown) and magnetic transducer head (not shown) to record or play the magnetic tape within the cartridge.

The cartridge locking mechanism of the present invention includes a cartridge sensing plate or lever 4 pivotally secured to the chassis 2 by a pin 5. The end portion of lever 4 includes a projection member, or portion, preferably a roller 7, and the other end of lever 4 includes a pin 8 mounted upwardly therefrom. The projection portion of lever 4 is biased by a compression coil spring 6 such that the roller 7 is positioned and extends into the tunnel. Accordingly, when the cartridge 1 is inserted into the tunnel, the inclined side wall portion 1a on the front corner of the cartridge engages roller 7 to force the roller 7 outwardly from the tunnel and rotate lever 4 in a clockwise direction.

A bracket or plate member 9 is rotatably mounted to the chassis 2 by a pin 10. The bracket 9 includes a retention member, preferably a roller 12, rotatably mounted thereon, which roller is positioned on the side of the bracket nearest the tunnel such that the roller 12 is engageable with a notch or recess 1b on the side wall of the fully inserted cartridge 1. The bracket 9 includes a slot 11 therein, which slot is engageable with pin 8 mounted on lever 4. The bracket 9 is biased by a tension spring 13 mounted to guide post 3 such that the retention roller 12 is projected into the tunnel to engage the side wall of the cartridge. In the embodiment disclosed hereinabove, although the engagement between lever 4 and bracket 9 is accomplished by pin 8 on lever 4 and slot 11 in bracket 9, it is readily understood that the invention is not limited to this specific embodiment. For example, it is possible to mount pin 8 on bracket 9 and to provide the slot 11 in lever 4.

For the purpose of affording a complete understanding of the operation of the present invention, a functional description of the mode in which the component parts cooperate will be described with respect to FIGS. 2 and 3.

In FIG. 2, prior to the insertion of the tape cartridge 1 into the tunnel of chassis 2, the projection member 7 on the end of lever 4 is biased into the tunnel by spring 6 and the bracket 9 and retention member 12 are held in a first position outside the tunnel by engagement of pin 8 on lever 4 with slot 11 in bracket 9. Upon insertion of the tape cartridge 1 into the tunnel, the inclined side wall portion 1a on the front corner of cartridge 1 engages projection member 7 and pushes the member 7 outside the tunnel thereby rotating lever 4 in a clockwise direction against the force of coil spring 6. The rotation of lever 4 causes the pin 8 to disengage slot 11 on bracket 9 thereby releasing bracket 9 from its latched position outside the tunnel. Tension spring 13 biases bracket 9 to rotate the bracket 9 and retention member 12 towards the tunnel. The retention member 12 engages the side wall of cartridge 1 and thereafter enters notch 1b when the notch becomes aligned with the retention member 12. When the tape cartridge is fully inserted into the tunnel, retention member 12 engages the forward surface of notch 1b to firmly maintain the tape cartridge in the play position, as shown in FIG. 3.

When the cartridge 1 is withdrawn from the play position, the retention member 12 is forced outwardly from notch 1b thereby causing bracket 9 to be rotated in a counterclockwise direction away from the tunnel. Simultaneously with the movement of bracket 9 away from the tunnel, the inclined side wall portion 1a on the front corner of cartridge 1 disengages projection member 7 on lever 4 thereby permitting spring 6 to bias lever 4 into the tunnel in a counterclockwise direction. Again pin 8 engages slot 11 on bracket 9 to hold the bracket away from the tunnel.

From the foregoing description, the cartridge locking mechanism provides a simple and reliable means for securing a tape cartridge in a tape player device which overcomes the defects present in the prior art. Additionally, the cartridge locking mechanism takes up a minimum of space within the player chassis to provide a compact tape cartridge player device.

Although the present invention has been described with respect to a certain specific embodiment, it is contemplated that modifications and changes may be made by those skilled in the art without departing from the true spirit and scope of the invention.

I claim:

1. A cartridge locking mechanism for use in a tape player device having a chassis defining a tunnel adapted to receive a tape cartridge upon insertion of the cartridge into the tunnel, said cartridge locking mechanism including in combination:

bracket means pivotally mounted to the chassis adjacent the tunnel, said bracket means including a slot therein, cartridge engaging means mounted on said bracket means, said bracket means being pivotally movable between a first position wherein said cartridge engaging means is positioned outside the tunnel and a second position wherein said cartridge engaging means is in engagement with a cartridge inserted in the tunnel, spring means coupled to said bracket means to bias the same from said first to said second position whereby said cartridge engaging means engages the inserted cartridge to hold the same in playing position, and cartridge sensing means pivotally mounted to the chassis adjacent the tunnel, said sensing means including one end portion biased into the tunnel for engagement by the inserted cartridge and an end portion opposite said one end portion having a projection thereon; said projection being engageable with said slot in said bracket means when said bracket means is in said first position to hold the same outside the tunnel, such that when a cartridge is inserted into the tunnel said one end portion is engaged by the inserted cartridge thereby deflecting said one end portion away from the tunnel and rotating said cartridge sensing means such that said end portion opposite said one end portion disengages said bracket means thereby causing said spring means to bias said bracket means from said first position to said second position and causing said cartridge engaging means to engage the inserted cartridge to hold the same in playing position.

2. The cartridge locking mechanism in accordance with claim 1 wherein said cartridge engaging means includes a roller mounted for rotation on said bracket means.

3. The cartridge locking mechanism in accordance with claim 1 wherein said one end portion of said cartridge sensing means includes a roller rotatably mounted thereon for engagement by the cartridge upon its insertion into the cartridge receiving opening.

4. The cartridge locking mechanism in accordance with claim 1 wherein said cartridge includes an inclined side wall portion near the front thereof for deflecting said sensing means upon insertion of the cartridge into the tunnel and a recess on the side thereof for cooperating with said cartridge engaging means upon the full insertion of the cartridge into the tunnel, said cartridge engaging means being deflected from said recess upon the withdrawal of the cartridge from the tunnel to pivot said cartridge engaging means and said bracket means from said second position to said first position.

5. The cartridge locking mechanism in accordance with claim 1 wherein said spring means includes a tension spring, one end of which is coupled to the chassis and the other end to the bracket means and wherein said one end portion of said cartridge sensing means is biased into the tunnel by a spring member mounted to the chassis.

* * * * *